United States Patent Office 3,479,360
Patented Nov. 18, 1969

3,479,360
2-METHYL OR PHENYL-7- OR 8-
CHLOROQUINOLINES
Andre Allais, Les Lilas, France, assignor to Roussel
UCLAF, Paris, France, a corporation of France
No Drawing. Filed Feb. 19, 1968, Ser. No. 706,658
Claims priority, application France, Feb. 22, 1967,
96,043
Int. Cl. C07d 33/52; A61k 27/00
U.S. Cl. 260—286
9 Claims

ABSTRACT OF THE DISCLOSURE

A chloroquinoline of the formula

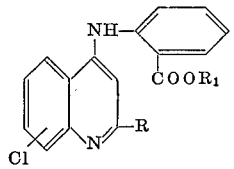

wherein is a member selected from the group consisting of methyl and phenyl, $R_1$ is a member selected from the group consisting of alkyl having 1 to 18 carbon atoms and substituted alkyl having 1 to 18 carbon atoms, and the chlorine atom is present in the molecule in a position selected from the group consisting of the 7 position and the 8 position, as well as its therapeutically compatible acid salts; the process of preparing the chloroquinolines and the method of therapy utilizing the chloroquinolines.
These chloroquinolines of the invention have a noteworthy anti-inflammatory action.

THE PRIOR ART

Phenylamino-chloroquinolines useful for their anti-inflammatory action have already been reported; see United State Patent Nos. 3,174,972 and 3,232,944. These previously reported compounds, however, also possess an analgesic action. In many instances, the concurrent analgesic action is undesirable in therapy.

OBJECTS OF THE INVENTION

An object of the invention is the obtention of novel chloroquinolines having a noteworthy anti-inflammatory action with an absence of analgesic properties.
Another object of the invention is the obtention of a quinolinic compound selected from the group consisting of a chloroquinoline of the formula

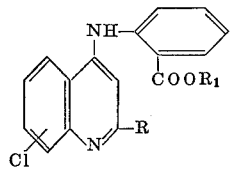

wherein R is a member selected from the group consisting of methyl and phenyl, $R_1$ is a member selected from the group consisting of alkly having 1 to 18 carbon atoms and substituted alkyl having 1 to 18 carbon atoms, and the chlorine atom is in a position selected from the group consisting of the 7 position and the 8 position; and its therapeutically compatible acid addition salts.
A further object of the invention is the development of a process for the preparation of the above quinolinic compound which comprises the steps of condensing an anthranilic ester of the formula

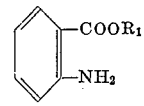

wherein $R_1$ is a member selected from the group consisting of alkyl having from 1 to 18 carbon atoms and substituted alkyl having from 1 to 18 carbon atoms, with a dichloroquinoline of the formula

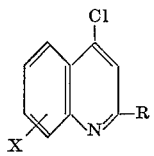

wherein R is a member selected from the group consisting of methyl and phenyl and X represents of chlorine in a position selected from the group consisting of the 7 position and the 8 position, in the presence of an inorganic acid, reacting the resulting inorganic acid salt with an acid acceptor, and recovering said quinolinic compound.
A yet further object of the invention is the obtention of a therapeutic composition consisting of an effective dosage amount of the above quinolinic compound and a major amount of a non-toxic pharmaceutical excipient.
A still further object of the invention is the development of a method of relieving inflammatory conditions in warm-blooded animals which comprises administering to warm-blooded animals an effective dosage amount of at least one of the above quinolinic compounds.
These and other objects of the present invention will become more apparent as the description thereof proceeds.

DESCRIPTION OF THE INVENTION

The invention involves chloroquinolines of the general formula I

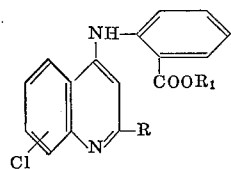

I wherein R represents the methyl radical or the phenyl radical, $R_1$ represents an eventually substituted alkyl radical, having from 1 to 18 carbon atoms, the chlorine atom being in the 7 position or in the 8 position, as well as their therapeutically compatible inorganic or organic acid salts.
The compounds of the general Formula I, as well as their therapeutically compatible inorganic or organic acid salts are endowed with valuable pharmacological properties. They exhibit especially a noteworthy anti-inflammatory action.
Quinolines of similar formula were already known (see, for example, French Patent No. 1,369,967, French Patent No. 1,421,229, U.S. Patent 3,174,972 or U.S. Patent 3,232,944). However, these prior art compounds are endowed both with an anti-inflammatory action and with an analgesic action.
The compounds, which are the object of the present invention, differ from the prior art compounds in the absence of analgesic properties, as evidenced by the pharmacological tests, although they entirely maintained the anti-inflammatory properties. This difference shows up in a mode of distinct action, and consequently they have a separate type of distinct action. The analgesic properties of the compounds described in French Patents Nos. 1,369,967 and 1,421,229 show a quick passage into the blood and thus to a blood-concentration in active principle, which reaches rapidly its maximum. This high blood-concentration lasts, in this case, for three hours maximum.

In contrast, the compounds of Formula I, which do not exhibit any analgesic properties are distinguished by the fact that their passage into the blood circulation occurs slowly, but progressively. Therefore, the resulting properties are definitely more durable and prolonged. Indeed, the pharmacological inflammation tests bring out the progressive and durable appearance of an inflammatory phenomena due to a chemical physical or bacterial toxic agent. The continuance of such an intense anti-inflammatory activity as that of these compounds, which, as contrasted to the prior art compounds, possess substituents in the 2-position, clearly demonstrates that the novel compounds exhibit a new type of activity the onset of which appears with more delay but lasts longer.

Preferably from the compounds of Formula I are the quinolenic compounds selected from the group consisting of a chloroquinoline of the Formula II

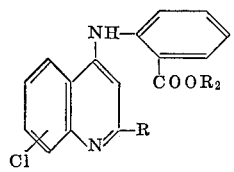

II wherein R is a member selected from the group consisting of methyl and phenyl, $R_2$ is a member having from 1 to 18 carbon atoms selected from the group consisting of alkyl, —$CH_2R_3$ and —$CHR_4R_5$ where $R_3$ is a member selected from the group consisting of furyl, lower alkoxycarbonyl-lower-alkyl, lower alkoxycarbonyl and lower alkanol, $R_4$ and $R_5$ are lower alkanol, and the chlorine atom is in a position selected from the group consisting of the 7 position and the 8 position; and its therapeutically compatible acid addition salts with acids selected from the group consisting of hydrochloric acid, acetic acid, tartaric acid, citric acid, malic acid, nicotinic acid, maleic acid and pamoic acid.

Among the chloroquinolines of general Formula I, the following may be mentioned:

2-methyl - 4 - [(2' - methoxycarbonyl) - phenylamino]-7-chloroquinoline (I, with R=$CH_3$, $R_1$=$CH_3$ and Cl in the 7 position);

2-phenyl - 4 - [(2' - methoxycarbonyl) - phenylamino]-7-chloroquinoline (I, with R=$C_6H_5$, $R_1$=$CH_3$ and Cl in the 7 position).

From the compounds of the general Formula I, which are particularly interesting, there may be mentioned those wherein the substituent $R_1$ represents one of the following radicals:

methyl, ethyl, n-propyl, isopropyl, n-butyl, n-octyl furfuryl —$CH_2$— 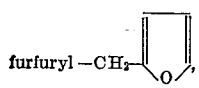, methoxycarbonylmethyl —$CH_2$—$COOCH_3$ α-glyceryl—$CH_2CHOHCH_2OH$, and β-glyceryl 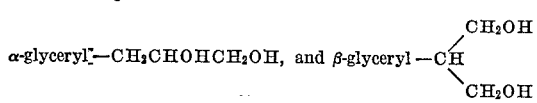

From the therapeutically compatible inorganic and organic acids, which may give salts with the compounds of the general Formula I, the following may be mentioned: Hydrochloric, acetic, D-tartaric, citric, maleic, nicotinic, malic, pamoic.

The products of general Formulas I and II, as well as their therapeutically compatible inorganic or organic acid salts are endowed with valuable pharmacological properties. They all exhibit a noteworthy anti-inflammatory action.

They may be used to treat inflammatory diseases in the warm-blooded animal, such as ankylosing spondylarthritis, acute articular rheumatism, arthrosis, discopathy, lumbago, zona, and as a complementary treatment for febrile and infectious conditions.

They may be used orally, transcutaneously, rectally or as topical applications on the skin.

They may be prepared as injectable solutions or suspensions, conditioned in ampoules, in multi-dose phials, as tablets, coated tablets, capsules, suppositories, pomades, creams, topical powders in the form of sprays, etc.

The useful dose range is between 3 mg./kg. and 100 mg./kg. per day in the warm-blooded animal and, for an adult, is between 200 mg. and 2 gm. per day depending upon the mode of administration.

The pharmaceutical forms such as injectable solutions or suspensions, tablets, coated tablets, capsules, suppositories, pomades, creams and topical powders in the form of sprays are prepared according to the usual methods.

The process for the preparation of the novel chloroquinolines having the general Formula I and of their therapeutically compatible inorganic or organic acid salts, is likewise an object of the invention.

The said process consists essentially in condensing, in the presence of an inorganic acid, an anthranilic ester of the formula

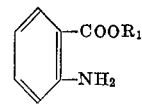

wherein $R_1$ is as defined hereinbefore, with a dichloroquinoline of the formula

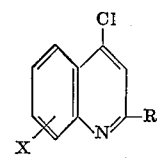

wherein R is as defined hereinbefore, and X representing a chlorine atom being in the 7 position or in the 8 position, obtaining a mineral acid salt of a compound having the Formula I, which is reacted with an acid acceptor, isolating the desired compound of Formula I and eventually converting the latter into a corresponding salt by the action of a therapeutically compatible inorganic or organic acid.

The process of the invention is advantageously effected as follows.

(1) The inorganic acid employed in the first step is hydrochloric acid, sulfuric acid or phosphoric acid.

(2) The acid acceptor is an alkali metal hydroxide, such as sodium or potassium hydroxide, ammonia, a primary organic base, for example, an alkanolamine, such as ethanolamine, a secondary organic base, for example, a di-lower-alkylamine, such as diethylamine, a tertiary organic base, such as pyridine or triethylamine.

Moreover, it is also possible to prepare the compounds of general formula I where $R_1$ is other than methyl by transesterification from the corresponding methyl ester.

The following examples illustrate the invention without, however, limiting it in any manner.

EXAMPLE 1

2-methyl-4-[(2'-methoxycarbonyl)-phenylamino]-7-chloroquinoline 5.5 gm. of 2-methyl-4,7-dichloroquinoline, 3.92 gm. of methyl anthranilate and 26 cc. of 2 N hydrochloric acid were refluxed for 3 hours. Thereafter the mixture was iced for one hour. The precipitate formed was filtered with suction, washed with water and dried at 100° C. in vacuo. 7.65 gm. of the hydrochloride of 2-methyl-4-[(2'-methoxycarbonyl)-phenylamino]-7-chloroquinoline were recovered in the form of yellow needles melting at 190° C.

The hydrochloride salt was dissolved at reflux in 100 cc. of a 50% aqueous ethanol solution. 3.3 cc. of triethylamine were added with agitation. The whole was iced and filtered with suction. The crystals obtained were washed by empasting with iced 50% ethanol and dried in vacuo at 100° C. 6.75 gm. of crude base were recovered and purified by recrystallization from boiling methanol to obtain 4.51 gm. of 2-methyl-4-[(2'-methoxycarbonyl)-phenylamino]-7-chloroquinoline.

The 2-methyl-4-[2'-methoxycarbonyl)-phenylamino]-7-chloroquinoline occurs in the form of yellow needles, sparingly soluble in alcohol and insoluble or very sparingly soluble in water, ether, acetone, benzene and chloroform. Its melting point, determined on the Kofler block, is 152°–153° C.

*Analysis.*—$C_{18}H_{15}N_2ClO_2$; molecular weight=326.5. Calculated percent: C, 66.16; H, 4.63; N, 8.57; Cl, 10.85. Found: C, 66.1; H, 4.5; N, 8.6; Cl, 11.0.

As far as is known, the 2-methyl-4-[(2'-methoxycarbonyl)-phenylamino]-7-chloroquinoline and its hydrochloride are not described in the literature.

The starting product, 2-methyl-4,7-dichloroquinoline, may be obtained according to the process described by Sen et al, J. Ind. Chem. Soc., 34 (1957), 833.

EXAMPLE 2

2-phenyl-4-[(2'-methoxycarbonyl)-phenylamino]-7-chloroquinoline 9.4 gm. of 2-phenyl-4,7-dichloroquinoline were suspended in 52.5 cc. of 2 N hydrochloric acid and 6 cc. of methyl anthranilate. 600 cc. of methanol were added and the whole was taken to reflux and maintained at reflux for 7½ hours. Then the reaction mixture was evaporated to dryness. The residue was taken up in 100 cc. of water, filtered with suction and washed with water. Thereafter, the residue was suspended in 100 cc. of water, alkalized with ethanolamine so as to obtain a pH=10 and extracted with methylene chloride. The extracts were washed with water until the wash waters were neutral, dried over sodium sulfate and evaporated to dryness in vacuo. 10 gm. of crude product were recovered. The crude product was impasted with 10 cc. of hot methanol. The temperature of the mixture was brought again to 20° C. The product was filtered with suction, washed with methanol, recrystallized from acetone, filtered with suction and dried at 70° C. in vacuo. 6 gm. of 2-phenyl-4-[(2'-methoxycarbonyl)-phenylamino]-7-chloroquinoline were obtained.

The 2-phenyl-4-[(2'-methoxycarbonyl)-phenylamino]-7-chloroquinoline occurs in the form of yellow prisms, soluble in chloroform, sparingly soluble in alcohol, acetone and benzene, and insoluble in water and ether. Its melting point, determined on the Kofler block, is 167° C.

*Analysis.*—$C_{23}H_{17}ClN_2O_2$; molecular weight=388.85. Calculated percent: C, 71.04; H, 4.41. Found: C, 70.7; H, 4.5.

Ultraviolet spectrum (ethanol):

$\lambda_{max.}$ at 219 m$\mu$ ---------------- $E\,_{1\,cm.}^{1\%}$=1,175

Infl. at about 234 m$\mu$ ---------------- $E\,_{1\,cm.}^{1\%}$=916

$\lambda_{max.}$ at 254 m$\mu$ ---------------- $E\,_{1\,cm.}^{1\%}$=868

$\lambda_{max.}$ at 277 m$\mu$ ---------------- $E\,_{1\,cm.}^{1\%}$=610

Infl. at about 341 m$\mu$ ---------------- $E\,_{1\,cm.}^{1\%}$=369

$\lambda_{max.}$ at 363 m$\mu$ ---------------- $E\,_{1\,cm.}^{1\%}$=501

As far as is known, the 2-phenyl-4-[(2'-methoxycarbonyl)-phenylamino]-7-chloroquinoline and its hydrochloride are not described in the literature.

The starting product, 2-phenyl-4,7-dichloroquinoline, may be obtained according to the process described by Susin et al., J. Am. Chem. Soc. 68, (1946), 1,270.

EXAMPLE 3

2-methyl-4[(2'-α-glyceryloxy-carbonyl)-phenylamino]-7-chloroquinoline

By working in the same manner as in Example 1, and starting from (2,3-isopropylidene-dioxy)-propyl anthranilate (described in U.S. Patent No. 3,232,944) and from 2-methyl-4,7-dichloroquinoline, there is obtained 2-methyl - 4 - [(2' - α - glyceryloxycarbonyl) - phenylamino]-7-chloroquinoline.

As far as is known, this compound and its hydrochloride are not described in the literature.

EXAMPLE 4

2 - phenyl - 4 - [(2' - α - glyceryloxycarbonyl) - phenylamino]-7-chloroquinoline By working in the same manner as in Example 2, and starting from (2,3-isopropylidene-dioxy)-propyl anthranilate (described in U.S. Patent No. 3,232,944) and from 2-phenyl-4,7-dichloroquinoline, there is obtained 2-phenyl - 4 - [(2' - α - glyceryloxycarbonyl) - phenylamino]-7-chloroquinoline.

As far as is known, this compound and its hydrochloride are not described in the literature.

EXAMPLE 5

2 - methyl - 4 - [(2' - methoxycarbonyl) - phenylamino]-8-chloroquinoline

By working in the same manner as in Example 1, and starting from methyl anthranilate and 2-methyl-4,8-dichloroquinoline (described by S. E. Krahler, J.A.C.S., 64 [1942] p. 2417), there is obtained 2-methyl-4-[(2'-methoxy-carbonyl)-phenylamino]-8-chloroquinoline.

As far as is known, this compound and its hydrochloride are not described in the literature.

EXAMPLE 6

2 - methyl - 4 - [(2' - α - glyceryloxycarbonyl) - phenylamino]-8-chloroquinoline By working in the same manner as in Example 1, and starting from (2,3-isopropylidene-dioxy)-propyl anthranilate (described in U.S. Patent No. 3,232,944) and 2-methyl-4,8-dichloroquinoline (described by S. E. Krahler, J.A.C.S. 64 [1942] p. 2417), there is obtained 2-methyl - 4 - [(2' - α - glyceryloxycarbonyl) - phenylamino]-8-chloroquinoline.

As far as is known, this compound and its hydrochloride are not described in the literature.

EXAMPLE 7

Pharmacological study of the compounds of the invention

*Anti-inflammatory activity.*—The test employed was that described by Branceni et al. (Arch. Int. Pharmacodyn, 1964, 152, 15), slightly modified. This consisted in the administration to rats weighing between 160 and 170 gm. each of a single injection of 500γ of naphthoyl-heparamide into the skin of the sole of a hind paw, this injection being intended to develop an inflammatory edema. The product to be studied was orally administered in an aqueous suspension, one hour prior to the injection. The amount of inflammation was determined by plethysmometry, the size of the paw being measured immediately prior and 2 hours after the irritating injection. The results obtained were expressed:

(a) Either by the degree of inflammation calculated as a percentage of that of the control animals, this degree of inflammation being furnished by the difference of the averages of the two measurements (average volume at the hour $H_2$, average initial volume $H_0$), (b) Or by the volumes at the hour $H_2$, adjusted to their initial level by the analysis of covariance. The statistic validity of the differences between each adjusted average and that of the control group was established by the Dunnett test (Dunnett, Amer. J. St. Aboc., 50, 1096 [1955]).

The 2 - methyl - 4 - [2' - methoxycarbonyl) - phenylamino]-7-chloroquinoline, utilized as an aqueous suspension, was orally administered at doses of 20 and of 100 mg./kg.

The 2 - phenyl - 4 - [(2' - methoxycarbonyl) - phenylamino]-7-chloroquinoline was administered under the same test conditions, at the dose of 100 mg./kg.

The following table summarizes the results obtained.

| Lots | Doses administered, mg./kg. | Volume of the Paw | | Degree of inflammation in percent of that of the controls | Volume at the hour $H_2$ average adjusted by analysis of covariance |
|---|---|---|---|---|---|
| | | Initial, $H_0$ | Final, $H_2$ | | |
| Controls | 0 | 31.3 | 43.5 | 100 | 43.6 |
| 2-methyl-4[(2'-methoxycarbonyl)-phenylamino]-7-chloroquinoline | 20 | 32.0 | 36.6 | 38 | 36.1 |
| Controls | 0 | 35.9 | 57.0 | 100 | 56.9 |
| 2-methyl-4[(2'-methoxycarbonyl)-phenylamino]-7-chloroquinoline | 100 | 36.2 | 42.8 | 31 | 42.5 |
| Controls | 0 | 35.0 | 56.6 | 100 | 55.2 |
| 2-phenyl-4[(2'-methoxycarbonyl)-phenylamino]-7-chloroquinoline | 100 | 34.0 | 45.9 | 56 | 46.3 |

According to these results, it can be ascertained that the two products possess a distinct anti-inflammatory activity, and that the 50% active dose of 2-methyl-4-[(2'-methoxycarbonyl)-phenylamino]-7-chloroquinoline is less than 20 mg./kg.

The preceding specific embodiments are illustrative of the practice of the invention. It is to be understood, however, that other expedients known to those skilled in the art or discussed herein may be utilized without departing from the spirit of the invention.

I claim:

1. A quinolinic compound selected from the group consisting of a chloroquinoline of the formula

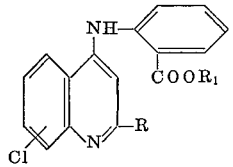

wherein R is a member selected from the group consisting of methyl and phenyl, $R_1$ is a member selected from the group consisting of alkyl having 1 to 18 carbon atoms, $CH_2$—$R_3$ and $CHR_4R_5$ wherein $R_3$ is selected from the group consisting of furyl, lower alkoxycarbonyl-lower alkyl, lower alkoxy-carbonyl and $CHOHCH_2OH$ and $R_4$ and $R_5$ are methanol and the chlorine atom is in a position selected from the group consisting of the 7-position and the 8-position; and its non-toxic pharmaceutically acceptable acid addition salts.

2. The quinolinic compound of claim 1 wherein R is methyl, $R_1$ is methyl and the chlorine atom is in the 7 position.

3. The quinolinic compound of claim 1 wherein R is phenyl, $R_1$ is methyl and the chlorine atom is in the 7 position.

4. The quinolinic compound of claim 1 wherein R is methyl, $R_1$ is α-glyceryl and the chlorine atom is in the 7 position.

5. The quinolinic compound of claim 1 wherein R is phenyl, $R_1$ is α-glyceryl and the chlorine atom is in the 7 position.

6. The quinolinic compound of claim 1 wherein R is methyl, $R_1$ is methyl and the chlorine atom is in the 8 position.

7. The quinolinic compound of claim 1 wherein R is methyl, $R_1$ is α-glyceryl and the chlorine atom is in the 8 position.

8. The quinolinic compound of claim 1 wherein said acid addition salt is the hydrochloride.

9. A quinolinic compound selected from the group consisting of a chloroquinoline of the formula

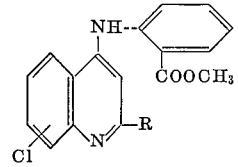

wherein R is a member selected from the group consisting of methyl and phenyl and the chlorine atom is in a position selected from the group consisting of the 7-position and the 8-position; and its non-toxic, pharmaceutically acceptable acid addition salts with an acid selected from the group consisting of organic acids and inorganic acids.

References Cited

UNITED STATES PATENTS

| 1,810,267 | 6/1931 | Desamari | 260—287 |
| 2,785,165 | 3/1957 | Shock et al. | 260—287 X |
| 3,026,322 | 3/1962 | Shock | 260—287 X |
| 3,174,972 | 3/1965 | Allais et al. | 260—287 |
| 3,232,944 | 2/1966 | Allais | 260—287 |
| 3,272,824 | 9/1966 | Ebetino | 260—288 |

DONALD G. DAUS, Primary Examiner

U.S. Cl. X.R.

260—287, 471, 283; 424—258